(12) United States Patent
Liao

(10) Patent No.: US 7,497,454 B2
(45) Date of Patent: Mar. 3, 2009

(54) LOCKING MECHANISM FOR A BICYCLE FORK

(75) Inventor: Hsueh-Hu Liao, Shenzhen (CN)

(73) Assignee: HL Corporation, Shenzhen (CN)

( * ) Notice: Subject to any disclaimer, the term of this patent is extended or adjusted under 35 U.S.C. 154(b) by 308 days.

(21) Appl. No.: 11/354,605

(22) Filed: Feb. 15, 2006

(65) Prior Publication Data
US 2006/0192363 A1 Aug. 31, 2006

(30) Foreign Application Priority Data
Feb. 25, 2005 (CN) .................... 2005 2 0055138 U

(51) Int. Cl.
*F16F 9/32* (2006.01)
(52) U.S. Cl. ...................... 280/276; 188/300
(58) Field of Classification Search ................. 280/276, 280/277, 279, 280; 188/300; 403/319, 320
See application file for complete search history.

(56) References Cited

U.S. PATENT DOCUMENTS

| | | | | |
|---|---|---|---|---|
| 4,167,352 A | * | 9/1979 | Pletscher | .................... 403/104 |
| 4,390,300 A | * | 6/1983 | Foster | ......................... 403/24 |
| 4,410,197 A | * | 10/1983 | St. Hillaire | ................. 280/279 |
| 4,679,811 A | * | 7/1987 | Shuler | ......................... 280/284 |
| 5,924,714 A | * | 7/1999 | Farris et al. | ................. 280/276 |
| 6,135,477 A | * | 10/2000 | D'Aluisio et al. | ........... 280/276 |
| 7,097,014 B2 | * | 8/2006 | Huang | ......................... 188/300 |
| 2004/0061303 A1 | * | 4/2004 | Felsl et al. | .................. 280/275 |

* cited by examiner

*Primary Examiner*—Kevin Hurley
(74) *Attorney, Agent, or Firm*—Eric Karich

(57) ABSTRACT

A locking mechanism adapted for locking a bicycle fork has a locking sheath and an adjusting rod. The locking sheath is adapted to be positioned within the bicycle fork. The adjusting rod is adapted to slidably engage the locking sheath. The adjusting rod is adapted to rotate with respect to the locking sheath between a locked configuration and an unlocked configuration. A first interlocking element of the adjusting rod lockingly engages with a second interlocking element of the locking sheath in the locked configuration, and the first and second interlocking elements are disengaged from each other when the adjusting rod is rotated to the unlocked configuration.

4 Claims, 2 Drawing Sheets

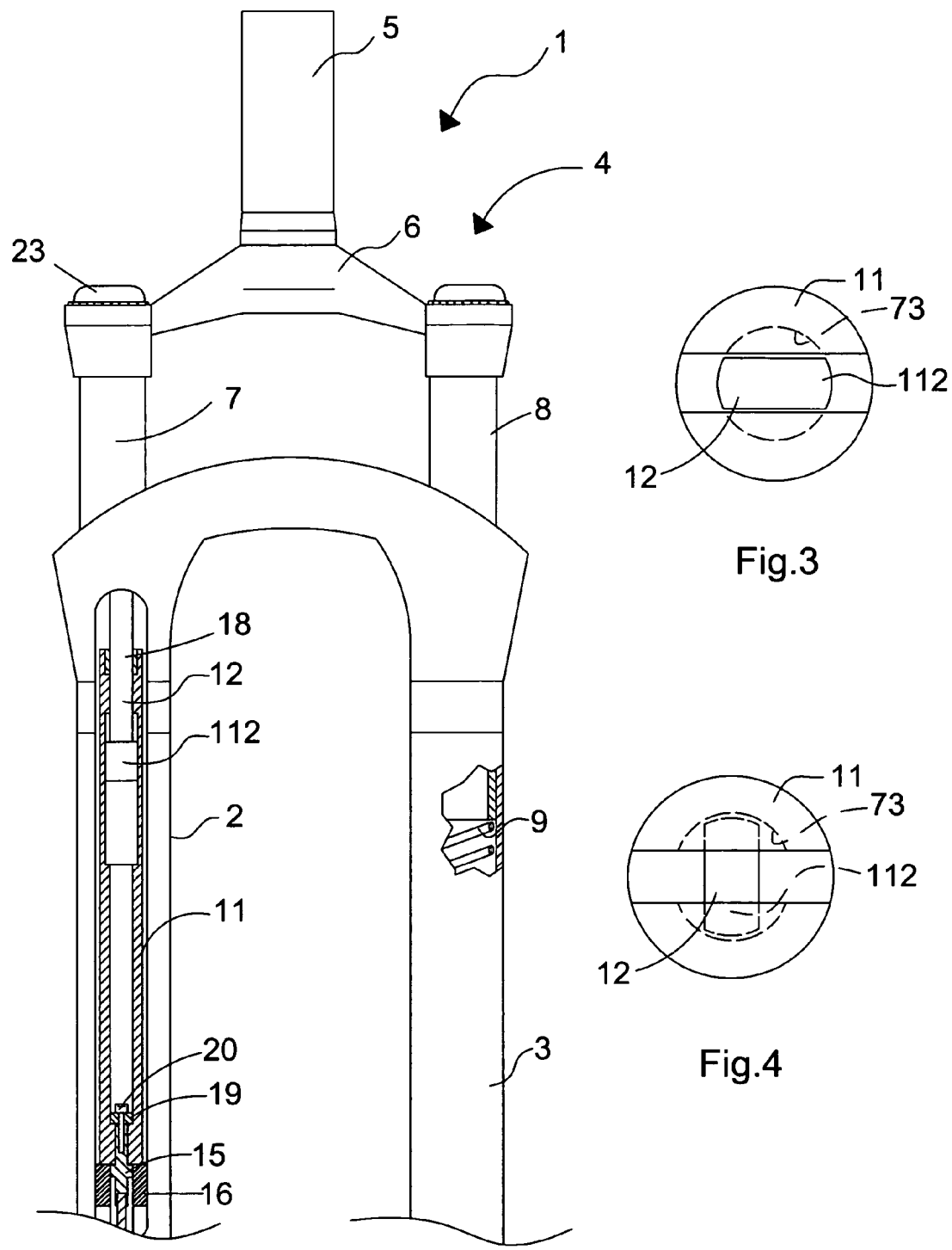

LOCKING MECHANISM FOR A BICYCLE FORK

BACKGROUND OF THE INVENTION

1. Field of the Invention

This invention relates generally to bicycle forks, and more particularly to a bicycle fork that includes a shock absorber and a locking mechanism for locking the bicycle fork in a locked position.

2. Description of Related Art

Prior art locking mechanisms for bicycle forks typically include two types of locking mechanisms: oil pressure locking and mechanical locking. The structure of the oil pressure locking mechanism is complicated and requires a high manufacturing precision and very high production costs. Moreover, this mechanism is prone to leaking oil, causing poor locking reliability. Therefore, the industry is more prone to using the mechanical locking approach.

The current mechanical locking mechanism is exposed outside the front fork and functions to interlock the external foot of the bicycle fork with the front upper fork. Since the mechanism is exposed outside the front fork, the whole appearance of the front fork is seriously affected. Furthermore, the manufacturing cost of this mechanism is relatively high.

The prior art teaches oil pressure (pneumatic) locking mechanisms within a bicycle fork, and the prior art also teaches external mechanisms for interlocking the boot and the upper fork of a bicycle fork. However, the prior art does not teach a simple, inexpensive, and internal mechanical mechanism for locking a bicycle fork. The present invention fulfills these needs and provides further related advantages as described in the following summary.

SUMMARY OF THE INVENTION

The present invention teaches certain benefits in construction and use which give rise to the objectives described below.

The present invention provides a locking mechanism adapted for locking a bicycle fork. The locking mechanism comprises a locking sheath and an adjusting rod. The locking sheath is adapted to be positioned within the bicycle fork. The adjusting rod is adapted to slidably engage the locking sheath. The adjusting rod is adapted to rotate with respect to the locking sheath between a locked configuration and an unlocked configuration. A first interlocking element of the adjusting rod lockingly engages with a second interlocking element of the locking sheath in the locked configuration, and the first and second interlocking elements are disengaged from each other when the adjusting rod is rotated to the unlocked configuration.

A primary objective of the present invention is to provide a locking mechanism for locking a bicycle fork, the locking mechanism having advantages not taught by the prior art.

Another objective is to provide a locking mechanism that is located within the bicycle fork, thereby providing the bicycle fork with an aesthetically pleasing exterior.

A further objective is to provide a locking mechanism that is both inexpensive to manufacture and reliable in use.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings:

FIG. 2 is a front elevational view of the bicycle fork, with a portion of the bicycle fork shown broken away to illustrate the locking mechanism assembled within the bicycle fork;

FIG. 3 is a sectional view thereof taken along line 3-3 in FIG. 2; and

FIG. 4 is a sectional view thereof taken along line 4-4 in FIG. 2.

DETAILED DESCRIPTION OF THE INVENTION

Figure 1:
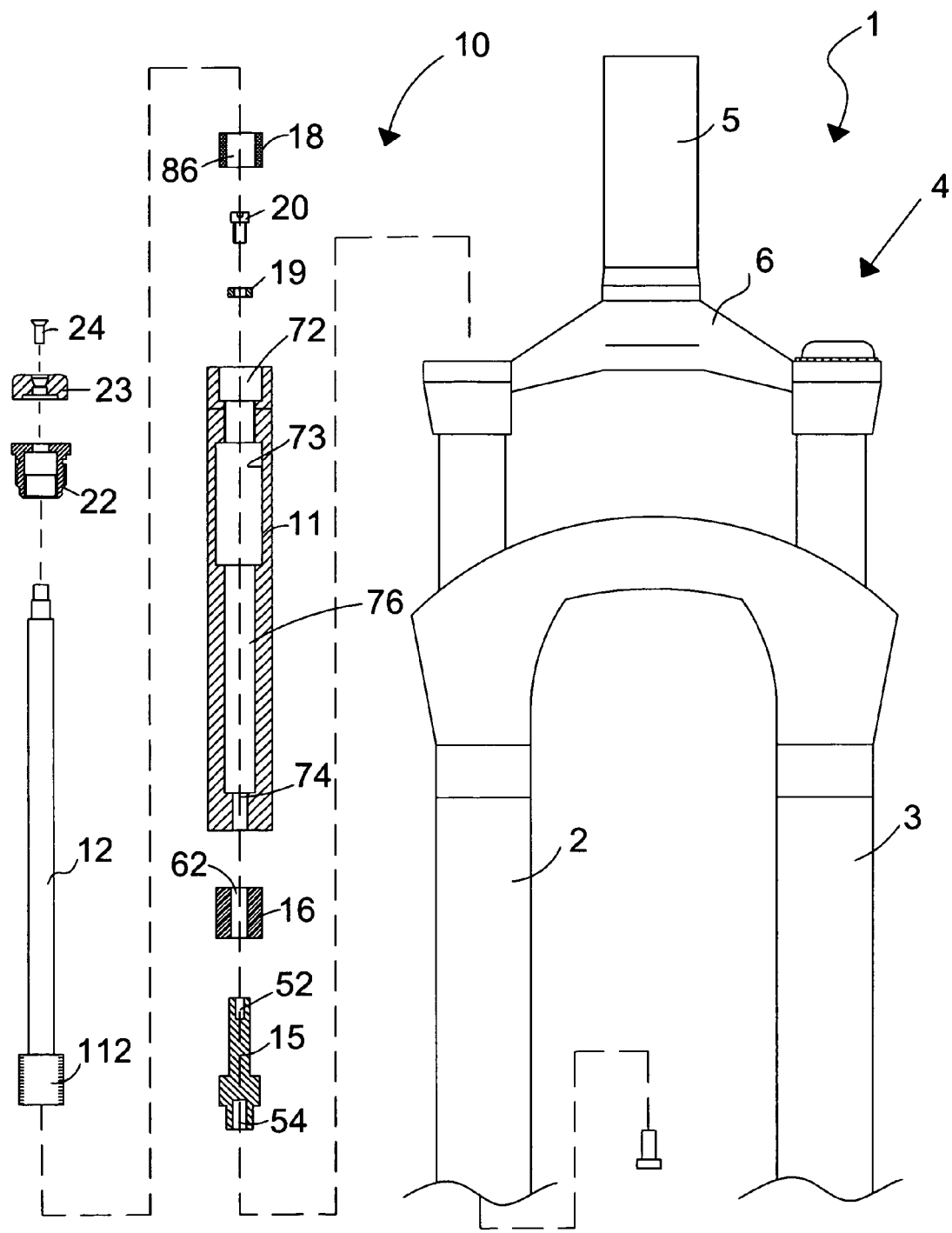
FIG. 1 is an exploded perspective view of a locking mechanism of a bicycle fork according to a preferred embodiment of the present invention.

The above-described drawing figures illustrate the invention, a bicycle fork 1 having a locking mechanism 10 in a first external foot 2 and a shock absorber 9 in a second external foot 3. The locking mechanism 10 functions to adjust the bicycle fork 1 between a locked configuration in which the bicycle fork 1 is locked and does not move, and an unlocked configuration in which the bicycle fork 1 functions as a shock absorber 9.

As shown in FIGS. 1 and 2, the bicycle fork 1 includes an upper fork 4 having a stem 5, a joint 6, a first internal tube 7, and a second internal tube 8. A first external foot 2 is adapted to telescopically engage the first internal tube 7, and a second external foot 3 is adapted to telescopically engage the second internal tube 8. The general structure of these features of the bicycle fork 1 is the same as prior art, and is therefore not described in greater detail herein. The terms used herein should be broadly defined and construed to include equivalent structures and minor modifications and reversals of the teachings of the present invention.

A shock absorber 9 is operably mounted within the first external foot 2. The shock absorber 9 is also similar to shock absorbers known in the prior art; the distinguishing feature is that in the bicycle fork 1 described herein, only a single shock absorber 9 is used, positioned in the first external foot 2. In the prior art, a shock absorber 9 is positioned in each of the first and second external feet 2 and 3. Since the specific structure of the shock absorber 9 is known in the prior art, and may vary depending upon the specific shock absorber 9 utilized, it is not shown in greater detail herein, but can be selected from the prior art by one skilled in the art.

The bicycle fork 1 includes a locking mechanism 10 operably mounted within the second external foot 3. Critical to the invention, the locking mechanism 10 includes a means for selectively locking the second external foot 3 with respect to the second internal tube 8. In the preferred embodiment, the locking mechanism 10 includes a locking sheath 11 and an adjusting rod 12. The adjusting rod 12 is adapted to slidably engage the locking sheath 11, and is also adapted to rotate with respect to the locking sheath 11 between a locked configuration and an unlocked configuration. While the embodiment illustrated is the currently preferred embodiment, those skilled in the art may develop alternative embodiments of the means for selectively locking the second external foot 3 with respect to the second internal tube 8, and such alternatives should be considered within the scope of the claimed invention. For example, a wide variety of elements could be disposed within the second external foot 3 and/or the second internal tube 8 to interlock with a second element and/or either the second external foot 3 and/or the second internal tube 8. A variety of slots, threads, or interlocking elements could be used, and all such alternative arrangements should be considered within the scope of the claimed invention.

A first interlocking element 112 of the adjusting rod 12 is adapted to engage a second interlocking element 73 of the locking sheath 11 when the adjusting rod 12 is rotated with respect to the locking sheath 11. The first and second interlocking elements 112 and 73 lockingly engaging each other when the adjusting rod 12 is rotated to the locked configuration, and the first and second interlocking elements 112 and 73 disengage from each other when the adjusting rod 12 is rotated to the unlocked configuration.

In one embodiment, as described in greater detail below, the first interlocking element 112 is an external thread 112 of the adjusting rod 12, and the second interlocking element 73 is a slot 73 of the locking sheath 11. The slot 73 is preferably internally threaded to receive the external thread 112 of the adjusting rod 12. Obviously, those skilled in the art may develop a wide variety of specific interlocking elements that are similar to or equivalent to the described embodiment, and such alternatives should be considered within the express scope of these terms, as the terms are hereby defined.

In the preferred embodiment, the locking mechanism 10 further includes a fixed base 15, a resilient element 16 (such as urethane rubber), the locking sheath 11, a small sliding sleeve 18, a gasket 19, a bolt 20, the adjusting rod 12, an upper-cap shield 22, an adjusting nut 23 and a screw 24. Blind holes 52 and 54 are made respectively at the upper part and lower part of the fixed base 15. Internal threads 75 are cut in the blind hole 52 and 54. The through-hole 62 is made from up to down in the resilient element 16 for the fixed base 15 to pass through. The holding hole 72 with a relatively large diameter is made in the upper end of the locking sheath 11; A through-hole 74 with a relatively small diameter is made in the bottom for the upper end of the fixed base 15 to pass through. An internal hole 76 or conduit connects the holding hole 72 and the through-hole 74. The internal thread 75 is tapped in the upper part of the internal hole 76. The slot 73 is milled in the two sides of the internal thread 75 (refer to FIGS. 3 and 4). The internal thread 75 and the slot 73 are alternately arranged. The small sliding sleeve 18 can be placed into the holding hole 72 of the locking sheath 11. A through-hole 82 is made from up to down in the small sliding sleeve 18. The external thread 112 is cut in the lower end of the adjusting rod 12. The external thread 112 is discontinuous (Refer to FIG. 3. It can be made by cutting a continuous and complete external thread 112 first and then milling its two sides to form a discontinuous external thread 112). There is a handle (not numbered in the figure) at the upper end of the adjusting rod 12. Internal thread is taped at the top of the handle. A through-hole is made from up to down in the upper-cap shield 22 for the handle of the adjusting rod 12 to pass through. A fixed hole (not numbered in the figure) is made in the adjusting nut 23 to insert the handle at the upper end of the adjusting rod 12.

When the locking mechanism 10 is secured to the internal tube of the shock-absorbing front fork, the upper end of the fixed base 15 passes through the through-hole 62 of the resilient element 16 and rest in the through-hole 74 at the lower end of the locking sheath 11. The bolt 20 passes through the holding hole 72 and internal hole 76 of the locking sheath 11 in sequence and is secured in the blind hole 52 at the upper part of the fixed base 15. The lower end of the fixed base 15 is secured to the bottom of the external foot with the bolt 20 and the gasket 19. The lower part of the adjusting rod 12 passes through the through-hole 82 of the small sliding sleeve 18 in the holding hole 72 of the locking sheath 11. The external thread 112 in the lower end of the adjusting rod 12 is in the internal hole 72 of the locking sheath 11. The screw 24 is used to secure the upper end of the locking sheath 11 that passes through the upper-cap sleeve 12 and the adjusting nut 23.

When the locking mechanism 10 is in an unlocked position, as shown in FIG. 3, the external thread 112 of the adjusting rod 12 faces the slot 73 of the locking sheath 11 and the external thread 112 of the adjusting rod 12 and the internal thread 75 of the locking sheath 11 are disengaged. The adjusting rod 12 can move up and down freely in the internal hole of the locking sheath 11. In this case, the second external foot 3 provides a shock-absorbing action. At this time, if the adjusting nut 23 is turned by 90 degree, the adjusting rod 12 will be driven to turn by 90 degree. This makes the external thread 112 of the adjusting rod 12 and the internal thread 75 of the locking sheath 11 engaged, as shown in FIG. 4. The adjusting rod 12 will not be able to move up and down freely in the internal hole of the locking sheath 11, and thus the entire front fork is locked.

Another advantage of the present construction is that the resilient element 16 is positioned under the locking sheath 11. The resilient element 16 provides a shock-absorbing effect if a violent shock occurs while the locking mechanism 10 is locked. This not only protects the rider from an uncomfortable shock, it also protects the structure of the bicycle body. As the internal thread 75 of the locking sheath 11 is long enough, the front fork of the utility model can be locked at any travel position.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A bicycle fork comprising:
    an upper fork having a stem, a joint, a first internal tube, and a second internal tube;
    a first external foot telescopically engaging the first internal tube;
    a second external foot telescopically engaging the second internal tube;
    a shock absorber operably mounted within the first external foot; and
    a locking mechanism operably mounted within the second external foot, the locking mechanism comprising:
    a locking sheath;
    an adjusting rod slidably engaging the locking sheath, the adjusting rod rotating with respect to the locking sheath between a locked configuration and an unlocked configuration;
    a first interlocking element of the adjusting rod; and
    a second interlocking element of the locking sheath,
    the first and second interlocking elements lockingly engaging each other when the adjusting rod is rotated to the locked configuration, and the first and second interlocking elements being disengaged from each other when the adjusting rod is rotated to the unlocked configuration,
    wherein the first interlocking element is a slot in the adjustment rod, and wherein the second interlocking element is an external thread in the locking sheath.

2. The bicycle fork of claim 1, wherein the locking mechanism includes an adjusting nut that operably controls the rotation of the adjusting rod, enabling the locking mechanism to be rotated between the locked configuration and the unlocked configuration.

3. A locking mechanism adapted for locking a bicycle fork, the locking mechanism comprising:
    a locking sheath adapted to be positioned within the bicycle fork;

an adjusting rod adapted to slidably engage the locking sheath, the adjusting rod being adapted to rotate with respect to the locking sheath between a locked configuration and an unlocked configuration;

a first interlocking element of the adjusting rod; and a second interlocking element of the locking sheath, the first and second interlocking elements lockingly engaging each other when the adjusting rod is rotated to the locked configuration, and the first and second interlocking elements being disengaged from each other when the adjusting rod is rotated to the unlocked configuration, wherein the first interlocking element is a slot in the adjustment rod, and wherein the second interlocking element is an external thread in the locking sheath.

4. The bicycle fork of claim 3, wherein the locking mechanism includes an adjusting nut that operably controls the rotation of the adjusting rod, enabling the locking mechanism to be rotated between the locked configuration and the unlocked configuration.

* * * * *